April 21, 1936.   C. C. GRAY ET AL   2,037,719
GRAIN ASPIRATOR
Original Filed May 24, 1930    2 Sheets-Sheet 1

INVENTORS
CARL C. GRAY
HARRY L. JOHNSON
BY
ATTORNEY

April 21, 1936.　　　C. C. GRAY ET AL　　　2,037,719
GRAIN ASPIRATOR
Original Filed May 24, 1930　　2 Sheets-Sheet 2

INVENTORS
CARL C. GRAY
HARRY L. JOHNSON
BY
ATTORNEY

Patented Apr. 21, 1936

2,037,719

UNITED STATES PATENT OFFICE 2,037,719

GRAIN ASPIRATOR

Carl C. Gray, Minneapolis, and Harry L. Johnson, St. Paul, Minn.

Original application May 24, 1930, Serial No. 455,233. Divided and this application October 24, 1932, Serial No. 639,283

13 Claims. (Cl. 209—139)

This invention relates to grain cleaning machinery, and the primary object is to provide a highly novel, efficient, and practical aspirating mechanism for removing relatively light foreign matter, such as dust and chaff, from granular materials such as the ordinary small grains, which are preferably aspirated before being subjected to separating and other processes.

This application is a division of our parent application Ser. No. 455,233, filed May 24th, 1930, for Grain scalping and aspirating machine patented July 17, 1934, No. 1,966,443.

In the drawings, forming part of the present application:

Figure 1:
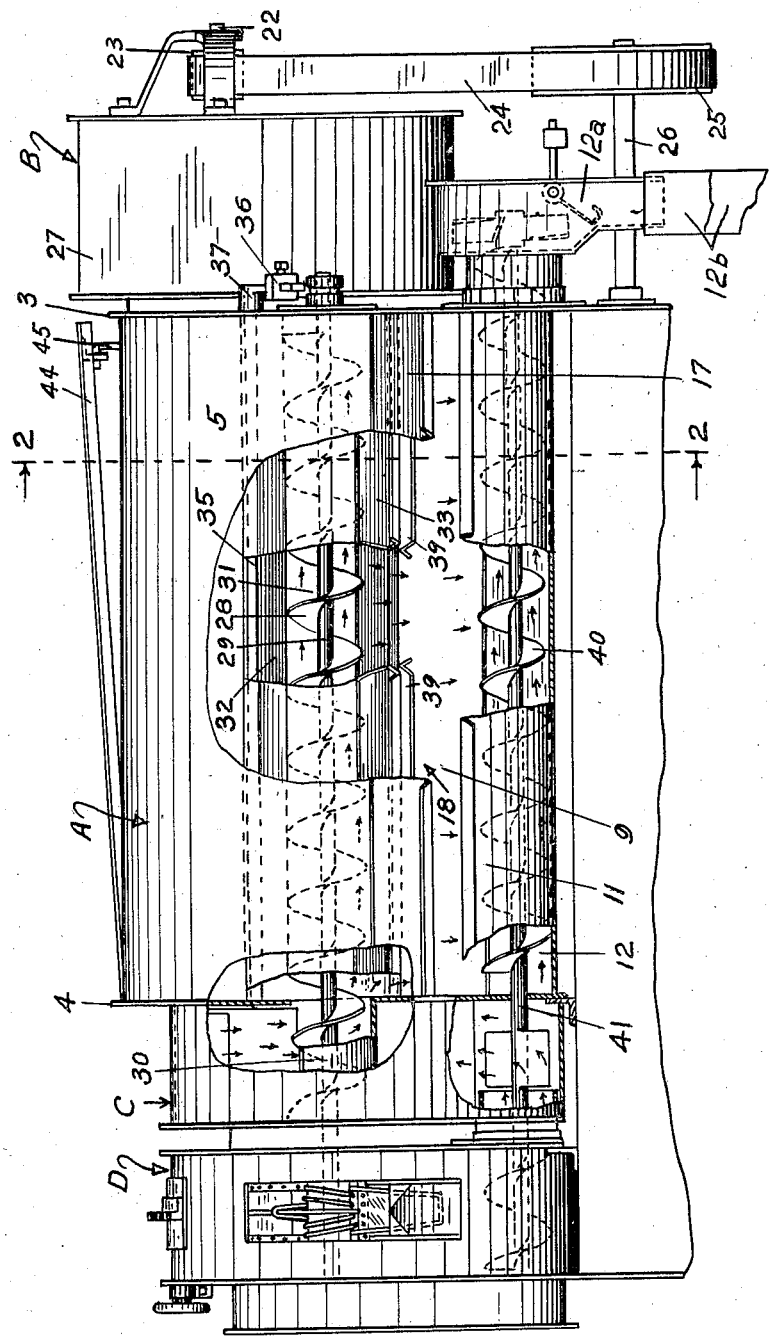
Fig. 1 is a front elevation of the machine with fractional portions broken away for purpose of illustration.

The above noted views correspond generally to Figs. 10 and 9, respectively, of the drawings in the parent application to which reference has been made.

Referring to the drawings more particularly and by reference characters, A designates a large enclosure or main housing within which the aspirating action takes place. This housing includes a pair of end walls 3 and 4, a front wall 5, a rear wall 6, top extensions 7 of said walls, an irregular bottom plate 8—9, joining to form a catch trough 10, and a second bottom plate 11, forming a trough 12. A partition plate 13, having a rearwardly inclined extension 14, extends down from the top 7, while a second partition or division plate, 15, extends upwardly from the plate 9. The lower end, 16, of the plate 15, slopes forwardly toward a corresponding but reversely sloped extension 17 of the wall 5, to thus form a throat or opening 18. Adjacent the opening 18 the plates 16 and 17 are preferably provided with angular reinforcing flanges 19. It will no doubt be understood that all of the members 5 to 19, inclusive, extend the entire length of the machine and have end contact with the walls 3 and 4.

The end wall 3 has a circular opening 20, between the plate members 6 and 13, and adjacent to which wall 3 is a blower housing B containing a centrifugal blower 21 mounted on a shaft 22. This shaft has a pulley 23 driven by a belt 24 from a pulley 25 on a power shaft 26. The fan housing B has an opening, as at 27, and when the fan is in operation it will cause a flow of air to pass outwardly through the opening 20 and thence through the housing B and outlet 27. This outlet 27 is of course preferably connected to a tubular conveyor so that the dust and chaff may be deposited at a suitable point remote from the machine. This action, by reason of the suction created in the rear part of the housing A, will cause an air current to flow up through the opening 18, over the baffle 15, under the plate 14, and thence to the opening 20, all as indicated by arrows.

Grain (or such other material as the machine may be used for) is introduced to the aspirating mechanism for treatment by a long feed screw 28 on a shaft 29. This screw extends into and receives its supply of material from a chamber or hopper 30 which is in turn supplied by other mechanisms, contained within associated housings C and D, as more fully set forth in our parent application.

The feed screw 28 operates in an elongated open bottom trough 31 formed by a pair of relatively movable side walls or plates 32 and 33, having support rods 34 pivoted at their ends in the end walls 3 and 4, so that the plates are free to swing on longitudinal pivot centers. In order to insure simultaneous and similar swinging actions to both plates I provide the coordinating device shown at 35, and this device also serves to close the top of the trough chamber 31.

As the grain is conveyed longitudinally through the trough 31, by the feed screw 28, its weight upon the lower inclined portions of the plates 32—33 tends to spread them, but this tendency is offset in part by a weight 36 adjustably secured to an arm 37 on one of the rods 34. Thus it will be seen that the size of the opening, 38, between the lower edges of the plates 32—33 will vary according to the volume or weight of grain accumulated about the feed screw 28 in the trough 31.

As the grain in the trough 31 falls in a curtainlike stream from the long opening 38 it falls upon an angle iron stream divider 39 which is rigidly secured at its ends in the housing walls 3 and 4. This divides the grain stream into two sheets or parts and deflects them outwardly to the plates 16—17, which in turn deflects them inwardly again so that the grain will pass through the opening 18 and fall upon the catch plate 11. From the catch plate 11 the grain finds its way to the trough 12 from which it is removed by a conveyor screw 40 on a shaft 41, receiving power from within the associated housings C and D. It may here also be noted that the trough or settling chamber 10 also has a feed screw, 42, on a shaft 43, for conveying away material deposited therein.

When the machine is in use the blower 21 and feed screw 28 are of course driven simultaneously, with a result that there is a current of air flowing through the machine, over the predetermined circuitous course already referred to, while the grain finds its way from the trough 31 to the trough 12.

As the air is drawn in from the outside over both the front and rear edges of the plate 11, it passes upwardly through the opening 18, whereupon it divides into two currents, one passing up between the members 16 and 32, while the other passes up between the members 17 and 33. The two air streams then again join, passing over partition 15 and thence under the baffle wall 13—14 and to the blower housing.

The force of the air current may be regulated to meet varying grain conditions in various ways, such as by modifying the speed of the fan, but we prefer to not disturb the fan speed, and to modify the air current through 18 by providing an auxiliary air inlet opening 43 in the top of the main housing A. The size of this opening is controlled by a door 44, one end of which is supported for vertical adjustment on a link 45 that connects with a crank arm 46 of an adjustable shaft 47. This shaft may be oscillated in any suitable manner, one method being illustrated in Fig. 2 of our parent application. As the door 44 is gradually opened the inrushing air will of course partially relieve or reduce the current drawn upwardly about the aspirator trough 31.

Figure 2:
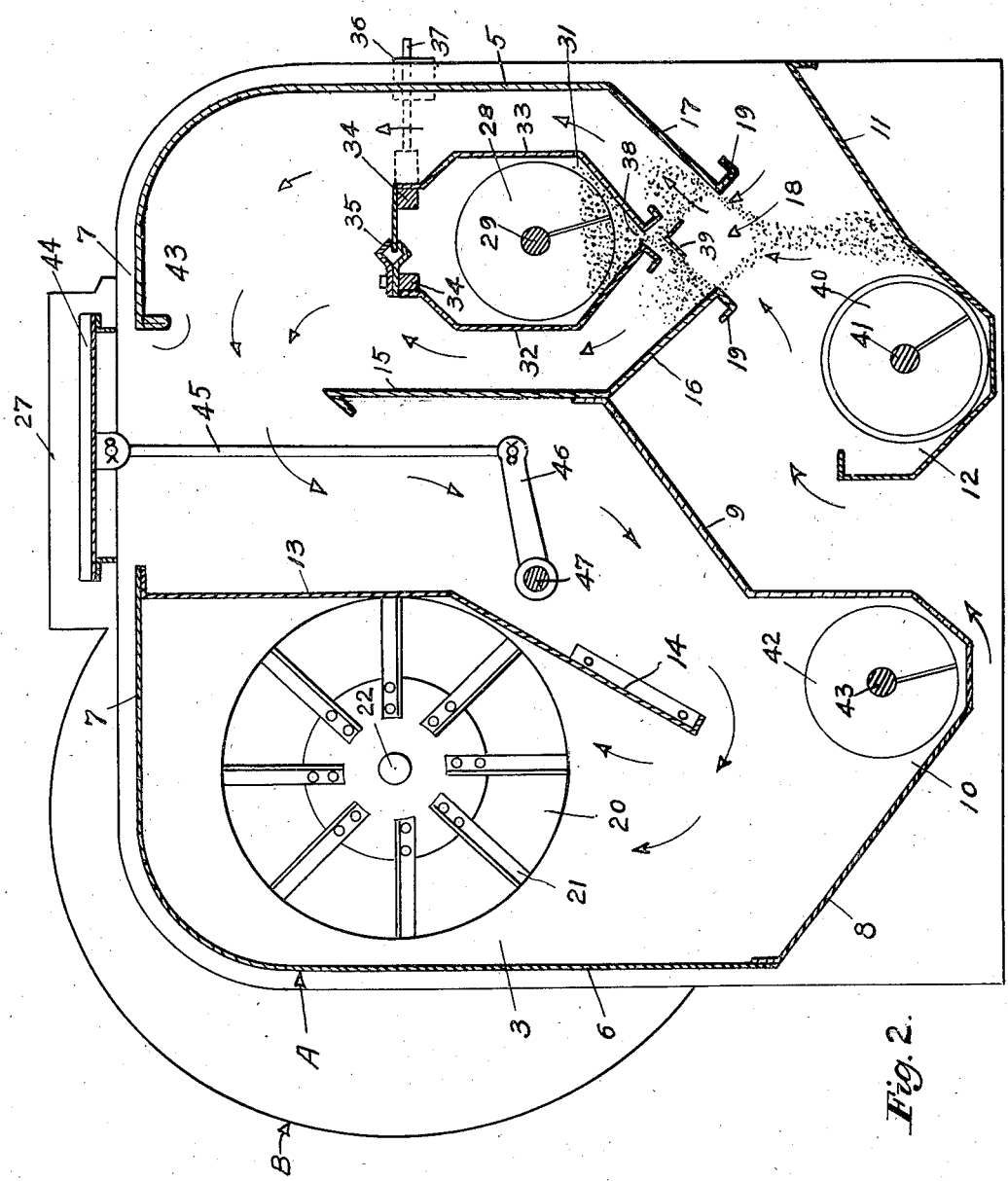
Fig. 2 is an enlarged sectional elevation on the line 2—2 in Fig. 1.

In the aspirating process proper, as it occurs under the trough 31, the curtain-like stream or flow of grain discharged from the opening 38 strikes the angle iron divider 39 and as it is deflected thereby the two streams of grain immediately come in contact with the strong upward flow of air through the opening 18. This air current, coming in from both sides (as seen in Fig. 2) does not merely shunt the grain stream to one side as would ordinarily be the case if only one air stream were employed, but thoroughly difuses and agitates the grain so that the air has an opportunity to reach and remove every particle of dust and chaff from the grain.

It will also be noted that the gap between the lower ends of the plates 16—17 is less than the combined widths of the spaces between the plates 15 and 32, and 5 and 33, and consequently the air stream, as it passes up through the opening 18, is more violent than when it reaches the less restricted spaces above. As a result of this arrangement it is found, in practice, that the grain is subject to a violent whirlpool action immediately above the opening 18 and only drops down to the catch plate 11 after having been thoroughly air cleaned in the whirlpool action noted.

As the grain gravitates from the cleaning zone the relatively lighter particles, such as dust and chaff, are carried over the partition 15 and follow with the air current under the baffle 14 to the blower. The heavier of these particles, however, may include some smaller grains and seed worth salvaging, and these are saved by being shunted into the settling chamber 10, as they will not so readily adhere to the second or diffused upward current passing to the opening 20. The completely cleaned grain falling into the trough 12 is augered out by the screw 40 into a distributor unit 12a, to be conveyed therefrom by tubes 12b to a separating mechanism all as more particularly shown and described in our above noted parent application.

Obviously various modifications and changes may be made in the construction of our machine as above disclosed without departing from the spirit and scope of the invention as set forth in the claims. Having now therefore fully shown and described a preferred embodiment of the invention, what we claim is:

1. A grain aspirating apparatus comprising a chamber having an elongated horizontally disposed restricted bottom opening for admitting an upward flow of air, a grain trough disposed horizontally within the chamber and having a bottom opening for discharging grain directly above the chamber opening, means for causing an upward flow of air through said chamber opening, said trough being disposed between and spaced at both sides with respect to opposite side walls of the chamber and also spaced below the top of the chamber so that the flow of air upwardly through the chamber opening will be deflected and divided into two separated currents passing one at each side of the trough and reuniting in the space above the trough.

2. A grain aspirating apparatus comprising a chamber having a restricted bottom opening for admitting an upward flow of air and an upper opening to exhaust such air, a grain trough disposed centrally within the chamber so as to provide separated lateral air passages between its sides and opposite side walls of the chamber and spaced below said upper opening to permit air from the lateral passages to reunite in the space above the trough, said trough having a discharge opening disposed above the chamber opening, said chamber opening being more restricted as to cross sectional area than that of the lateral passages combined whereby the force of the air flow will be decreased after passing through the chamber opening, and means for creating and maintaining said air flow.

3. A grain aspirator comprising a trough formed of hingedly mounted side plates the lower edges of which are yieldingly pressed toward each other but sufficiently spaced apart to form a longitudinal discharge opening, an air current creating device, and means for directing two air currents toward each other whereby they will meet and come in contact from opposite sides of the grain being discharged from the trough opening and thereafter divide and pass upwardly about both sides of the trough.

4. A grain aspirating apparatus comprising a chamber having inwardly sloped bottom members spaced at their lower ends to provide a passage for an upward flow of air and a downward flow of grain, a grain supply receptacle disposed within the chamber, above said passage and spaced from the side walls of the chamber so as to divide the upward air flow into two separate streams, and means for dividing the flow of grain from the receptacle to said passage into two lateral streams whereby said streams may respectively come into cleaning contact with said two air streams.

5. In an aspirating apparatus the combination including a chamber having a bottom opening for an upward flow of air, a receptacle in said chamber and spaced from opposite walls thereof to divide said air flow into two streams, said receptacle having a discharge opening for providing a flow of grain downwardly through the chamber opening, means for maintaining an upward flow of air through said chamber opening, and means for dividing the grain flow into two streams as it leaves the receptacle.

6. In an aspirating apparatus the combination including a chamber having a bottom opening for an upward flow of air, a receptacle in said chamber and spaced from opposite walls thereof to divide said air flow into two streams, said receptacle having a discharge opening for providing a flow of grain downwardly through the chamber opening, means for maintaining an upward flow of air through said chamber opening, means for dividing the flow of grain from the receptacle opening into two streams, and means for reuniting the grain streams as they are discharged through the chamber opening, whereby air flowing up through said chamber opening will traverse each grain stream twice.

7. In an aspirating apparatus the combination including a chamber having a bottom opening for an upward flow of air, a receptacle in said chamber and spaced from opposite walls thereof to divide said air flow into two streams, said receptacle having a discharge opening for providing a flow of grain downwardly through the chamber opening, means for maintaining an upward flow of air through said chamber opening, and a stationary divider member having inclined surfaces for dividing the grain flow laterally as it leaves the receptacle.

8. A grain aspirating apparatus comprising a housing through which air is drawn from a bottom opening to an initial treating chamber, means for producing the air flow, a grain receptacle disposed entirely within said chamber and spaced from the top and sides thereof so as to divide and permit reuniting of the air flow therethrough and for discharging grain to said opening, and a passageway for conducting air from the top of said chamber, said receptacle having its top closed to prevent material conveyed by the air flow from falling into the receptacle.

9. A grain aspirating apparatus comprising a housing through which air is passed from a bottom opening to an initial treating chamber, means for producing the air flow, a grain receptacle disposed entirely within said chamber and spaced from the top and sides thereof so as to divide and permit reuniting of the air flow therethrough and for discharging grain to said opening, and a passageway for conducting air from the top of said chamber, said receptacle having its top closed to prevent material conveyed by the air flow from falling into the receptacle, and means for feeding grain horizontally into the receptacle from one end thereof.

10. A grain aspirating apparatus comprising a horizontally disposed chamber having a longitudinally extending opening in its bottom forming a passage for an upward flow of air and a downward flow of grain, and said chamber having an air outlet opening in its upper end, means for producing an air current through said chamber, a grain supply receptacle extending from end to end within the chamber and having a longitudinal bottom opening disposed directly over said chamber bottom opening, said receptacle being spaced from the bottom, top and side walls of the chamber so as to divide the air flow upwardly from the chamber bottom opening into two separate, substantially equal air currents, and means for feeding grain into said supply receptacle from one end thereof and distributing such grain throughout the length of the receptacle.

11. A grain aspirating apparatus comprising a horizontally disposed chamber having a longitudinally extending opening in its bottom forming a passage for an upward flow of air and a downward flow of grain, and said chamber having an air outlet opening in its upper end, means for causing an upward air current through the chamber, a grain supply receptacle extending from end to end within the chamber and having a longitudinal bottom opening disposed directly over said chamber bottom opening, said receptacle being spaced from the bottom, top and side walls of the chamber so as to divide the air flow upwardly from the chamber bottom opening into two separate, substantially equal air currents, means for supplying grain to the receptacle, and means for adjusting the size of the receptacle opening to control the flow of grain therefrom.

12. A grain aspirating apparatus comprising a horizontally disposed chamber having a longitudinally extending opening in its bottom forming a passage for an upward flow of air and a downward flow of grain, and said chamber having an air outlet opening in its upper end, means for causing an upward air current through the chamber, a grain supply receptacle extending from end to end within the chamber and having a longitudinal bottom opening disposed directly over said chamber bottom opening, said receptacle being spaced from the bottom, top and side walls of the chamber so as to divide the air flow upwardly from the chamber bottom opening into two separate, substantially equal air currents, and means for feeding grain into said supply receptacle from one end thereof and distributing such grain throughout the length of the receptacle, said receptacle being entirely enclosed, except for its bottom opening, whereby to prevent grain or other matter from falling into the receptacle from the lateral air streams passing upwardly thereabout.

13. In an element of a machine of the kind described, the combination of an air-chamber having an air-outlet at its upper part, an air-inlet at its lower part, an air-inlet at its intermediate part, a container for cleaned seeds at its lower part, means for causing an upward air-current through the first said air-inlet and for causing a horizontal air-current through the second said air-inlet, means to introduce seeds into said air-inlet of the intermediate part in such manner that the seeds pass horizontally into the upward air-current so the latter carries dust and light trash from the seeds and permits the seeds to fall into said container, a plate to guide a portion of the seeds into said container, and means to convey the seeds horizontally from said container.

CARL C. GRAY.
HARRY L. JOHNSON.